Aug. 8, 1967     E. R. STETTNER     3,334,874
CARBURETOR ACCELERATING CONTROL

Filed Jan. 5, 1966     2 Sheets-Sheet 2

INVENTOR.
Ernest R. Stettner
BY
C. K. Veenstra
ATTORNEY

| United States Patent Office | 3,334,874 |
|---|---|
| | Patented Aug. 8, 1967 |

3,334,874
CARBURETOR ACCELERATING CONTROL
Ernest R. Stettner, Spencerport, N.Y., assignor to General Motors Corporation, Detroit, Mich., a corporation of Delaware
Filed Jan. 5, 1966, Ser. No. 518,834
1 Claim. (Cl. 261—23)

ABSTRACT OF THE DISCLOSURE

A four barrel, multiple-stage carburetor has a pair of small plain tube primary mixture conduits transversely spaced on opposite sides of a small, centrally located fuel bowl and a pair of large air valve secondary mixture conduits transversely spaced across the rear of the fuel bowl. A pair of air bled accelerating wells discharge fuel into the secondary mixture conduits through ports traversed by the air valves.

---

An air valve carburetor meters fuel past a metering rod positioned by an air flow sensing valve. Conventionally, this air valve is a butterfly plate rotatably disposed in the mixture conduit and controlled by engine vacuum and a biasing mechanism to maintain a constant pressure drop across the valve. Thus, the rotative position of the air valve is determined by and is a measure of air flow through the mixture conduit to the engine.

This invention provides a well of fuel which discharges through a port adjacent the upstream edge of the air valve. When the valve is closed, the discharge port is upstream of the valve, but as the valve opens, its upstream edge traverses the port to subject the accelerating well to the depression therebelow. An atmospheric bleed opens into the well so that when it is subjected to the air valve depression, the well is suddenly emptied to enrich the air-fuel mixture provided by other metering mechanism within the carburetor.

The details as well as other objects and advantages of this invention are disclosed in the following description and in the drawing in which.

Figure 1:
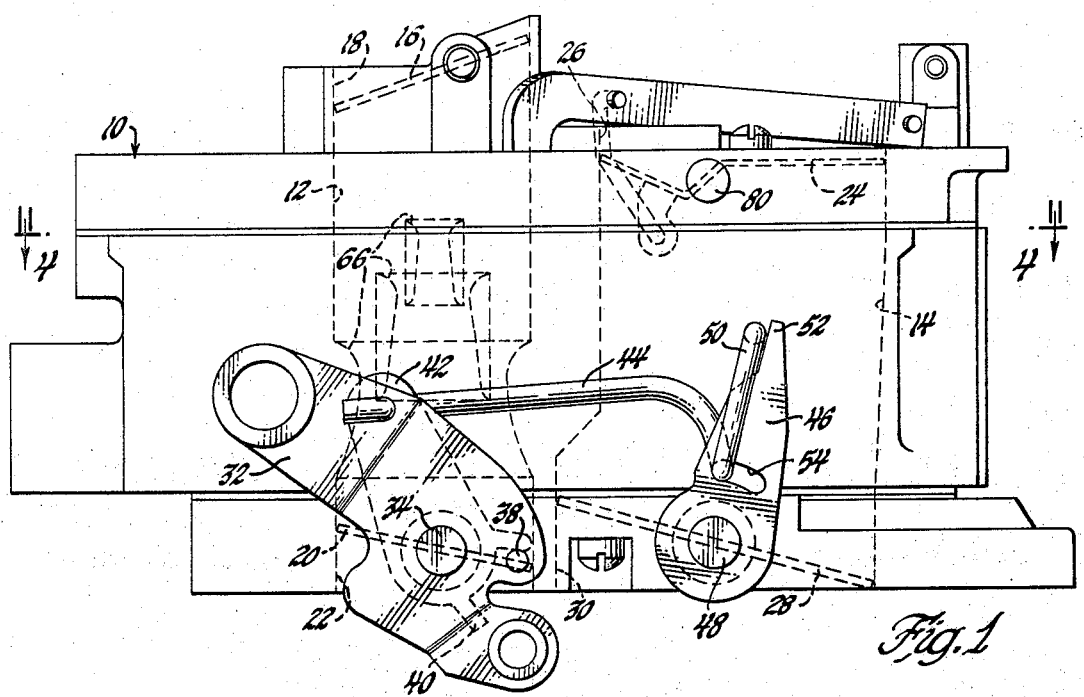
FIGURE 1 is a side elevational view of a multiple stage carburetor in which the secondary stage employs air valve control of the fuel metering.
Figure 2:
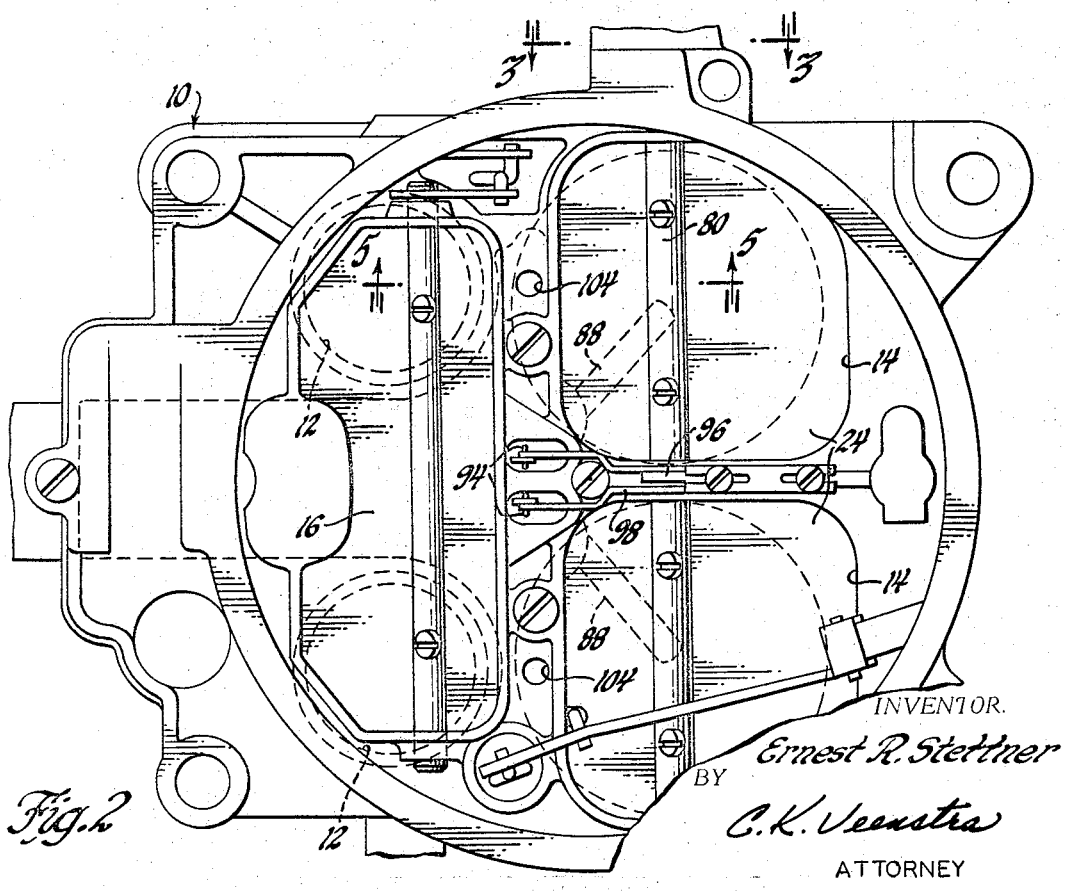
FIGURE 2 is a top plan view of the carburetor of FIGURE 1 illustrating the linkage between the air valves and the metering rods in the secondary stage.

Referring first to FIGURES 1 and 2, the carburetor 10 has a pair of primary mixture conduits 12 and a pair of secondary mixture conduits 14. A choke valve 16, controlled in the conventional manner, is disposed in the inlet 18 to primary mixture conduit 12. A throttle valve 20 is disposed in the outlet 22 from each primary mixture conduit 12. An air valve 24 is disposed in the inlet 26 to each secondary mixture conduit 14, and a throttle valve 28 is disposed in the outlet 30 from each secondary mixture conduit 14.

A primary throttle lever 32 is secured to the primary throttle shaft 34. A pin 38 is carried by lever 32 which, after predetermined opening movement of primary throttle lever 32, contacts a tang 40 on a lever 42 rotatably mounted about shaft 34. Subsequent opening movement of primary throttle lever 32 produces clockwise rotation of lever 42. A link 44 secured to lever 42 contacts a secondary throttle lever 46 secured to the secondary throttle shaft 48. Initial clockwise rotation of lever 42 moves link 44 toward the right whereupon the upper portion 50 of link 44 contacts the extended arm 52 of secondary throttle lever 46 to produce initial opening movement of secondary throttle 28. This initial cracking of secondary throttle valves 28 reduces the pressure drop across the throttle valves 28 and overcomes the frictional load on throttle shaft 48. During this initial opening of secondary throttle valves 28, link 44 slides through a slot 54 in lever 46. When link 44 contacts the end of slot 54, a shorter lever arm is provided on secondary throttle lever 46 and secondary throttles 28 are opened at an increased rate.

Figure 4:
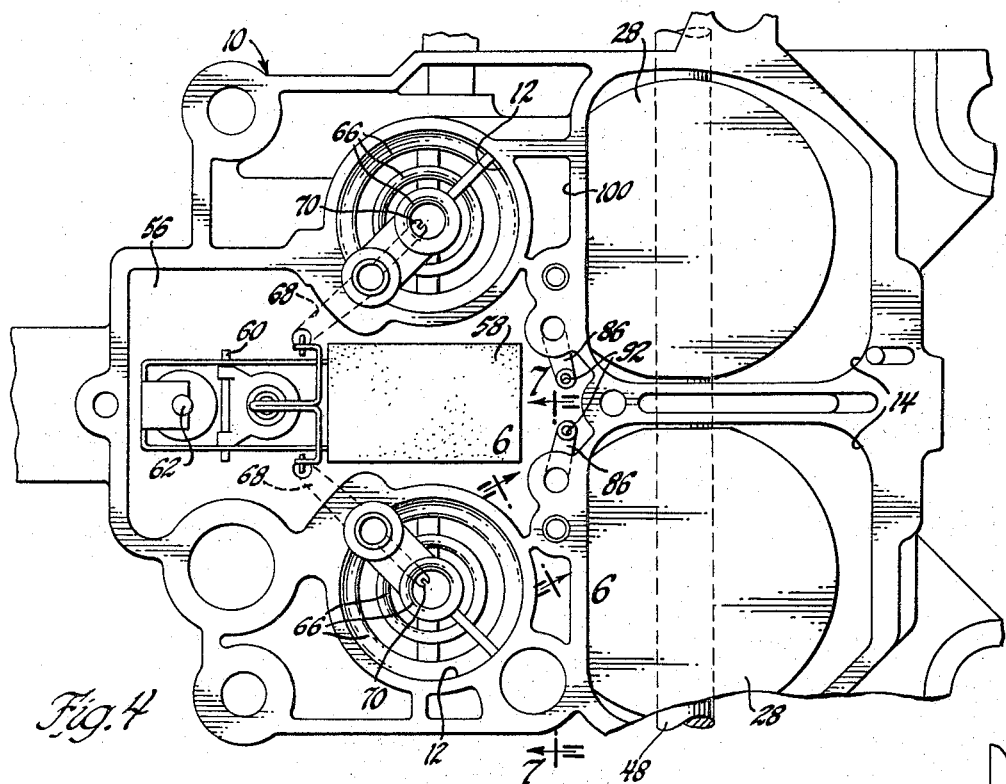
FIGURE 4 is a view of the carburetor with the air horn section removed, taken generally along line 4—4 of FIGURE 1, and thus illustrating the location of the accelerating wells.

Referring to FIGURE 4, it will be noted that the pair of primary mixture conduits 12 are transversely disposed on opposite sides of a single fuel bowl chamber 56 and that secondary mixture conduits 14 are transversely disposed at the end of fuel bowl 56. A float pontoon 58 in fuel bowl 56 is located substantially at the center of the carburetor and pivots about a pin 60 to regulate an inlet valve 62 which controls fuel flow through the inlet to fuel bowl chamber 56. By locating pontoon 58 in the center of the carburetor, its response to surges of fuel in bowl 56 is reduced and the inlet valve 62 is held on its seat.

A venturi arrangement 66 is disposed in each primary mixture conduit 12 to provide a pressure signal indicative of the primary air flow. A pair of fuel passages 68 extend from fuel bowl 56 and terminate in nozzles 70 discharging into each of the small venturis 66. The rate of discharge of fuel into venturis 66 is directly controlled by the pressure therein.

Figure 3:
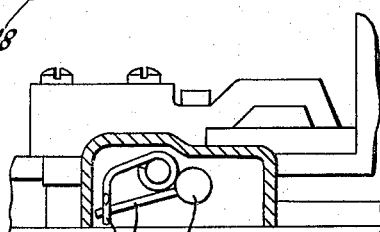
FIGURE 3 is a sectional view along line 3—3 of FIGURE 2 illustrating the air valve return spring.

In the secondary stage, air valves 24 are secured on a shaft 80 and are opened by vacuum in mixture conduit 14 as throttle valves 28 are opened. As shown in FIGURE 3, shaft 80 carries a pin 82 around which a spring 84 is looped. As air valves 24 are opened, pin 82 pulls against spring 84 to bias the air valves to a closed position. Spring 84 slides along pin 82 so that a constant pressure is maintained in mixture conduits 14 below air valves 24 throughout the range of air valve opening movement.

A pair of fuel passages 86, shown in FIGURE 4, extend from fuel bowl 56 to nozzles 88 shown in FIGURE 2. Nozzles 88 discharge fuel in an even dispersion throughout each mixture conduit 14. Flow through fuel passages 86 is controlled by metering orifices 92 shown in FIGURE 4 and associated metering rods 94 shown in FIGURE 2.

Referring further to FIGURE 2, a cam 96 mounted on air valve shaft 80 moves a follower 98 which, as air valves 24 open, withdraws metering rods 94 from orifices 92 to increase fuel flow into secondary mixture conduits 14.

The above-described carburetor is more completely disclosed in the patent application Ser. No. 504,961, filed Oct. 24, 1965, in the names of E. A. Kehoe and D. D. Stoltman. Therefore, it has been only briefly described here.

Figure 5:
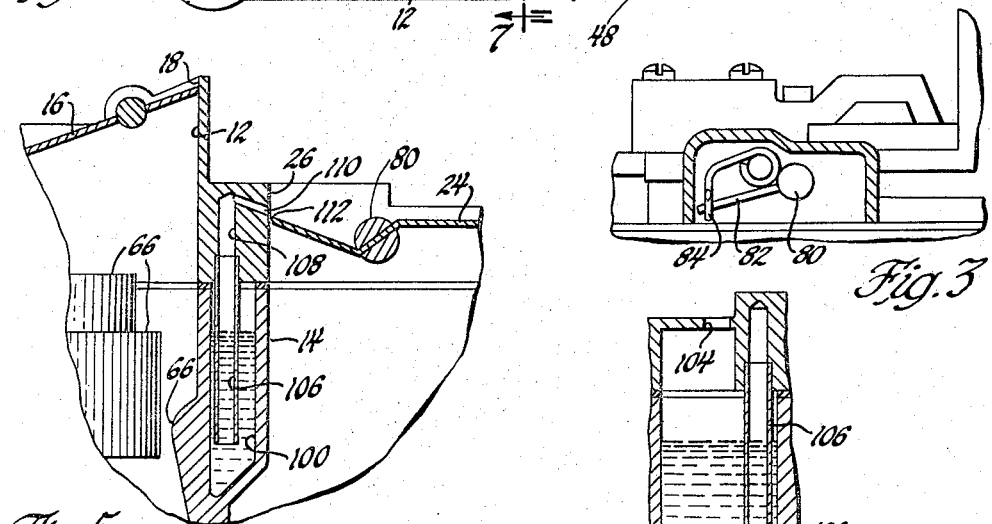
FIGURE 5 is a sectional view along line 5—5 of FIGURE 2 illustrating the discharge passage of one accelerating well.
Figure 7:
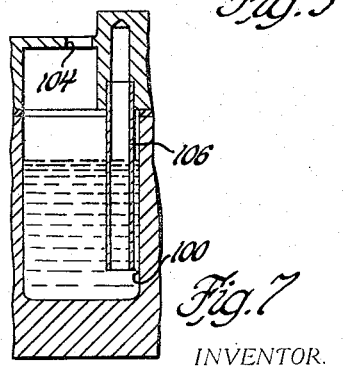
FIGURE 7 is a sectional view along line 7—7 of FIGURE 4 illustrating the air bleed for one accelerating well.
Figure 6:
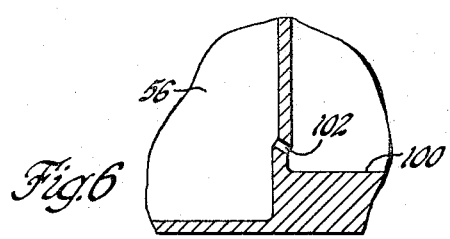
FIGURE 6 is a sectional view along line 6—6 of FIGURE 4 illustrating the passage by which one accelerating well is filled from the fuel bowl.

Referring now to FIGURES 4 through 7, a pair of accelerating wells 100 are located adjacent the secondary mixture conduits 14. As shown in FIGURE 6, a restricted passage 102 connects each well 100 with fuel bowl 56 so that float mechanism 58 tends to maintain a constant level of fuel in wells 100. As shown in FIGURE 7, an air bleed 104 opens into each accelerating well above the level of fuel therein. A discharge tube 106, shown in FIGURES 5 and 7, depends into each well 100 below the fuel level therein and is connected to a passage 108 which leads to a discharge point 110 in the inlet 26 of secondary mixture conduit 14 adjacent the upstream edge 112 of air valve 24.

Referring particularly to FIGURE 5, it will be appreciated that as air valve 24 opens its upstream edge 112 traverses discharge point 110 to subject the accelerating well 100 to the depression below air valve 24. The sudden difference in pressures acting on the fuel in accelerating well 100, that is, atmospheric pressure on the surface of the fuel from air bleed 104 and air valve depression below the surface of the fuel from discharge tube 106, causes the fuel to suddenly discharge into mixture conduits 14. After the well has been emptied, a low rate of fuel is continually discharged through discharge point 100, the rate being limited by the restriction of passage 102.

It will therefore be appreciated that this invention provides means to enrich the mixture by the amount of fuel in accelerating wells 100 as the secondary stage of the carburetor is brought into operation and air valve 24 begin to open.

I claim:

An internal combustion engine carburetor comprising a fuel bowl including means to maintain fuel therein at a substantially constant level, a pair of primary mixture conduits transversely spaced on opposite sides of said fuel bowl, a pair of secondary mixture conduits transversely spaced at one end of said fuel bowl, primary and secondary throttles controlling flow through said primary and secondary mixture conduits respectively, means for sequentially operating said primary and secondary throttles, air valves rotatably disposed in said secondary mixture conduits, means controlling said air valves whereby their rotative position is responsive to and is a measure of air flow through said secondary mixture conduits, fuel delivery passages extending from said fuel bowl to said secondary mixture conduits, means positioned by said air valves to control fuel flow through said delivery passages, a pair of accelerating wells transversely disposed on opposite sides of said fuel bowl and longitudinally disposed between said primary and secondary mixture conduits, restricted passages leading from said fuel bowl below the level of fuel therein and extending to said accelerating wells whereby fuel flows into said wells and tends to seek a predetermined level, air bleeds opening into said accelerating wells above the level of fuel therein, and discharge passages leading from said wells below the level of fuel therein and extending to discharge points in said secondary mixture conduits, said discharge points being upstream of said air valves when closed and downstream of said valves when open whereby an accelerating charge of fuel is delivered from said wells as said valves open.

References Cited

UNITED STATES PATENTS

| | | | |
|---|---|---|---|
| 1,958,542 | 5/1934 | Kirby | 261—34 XR |
| 2,832,576 | 4/1958 | Henning | 261—23 |
| 2,890,031 | 6/1959 | Carlson et al. | 261—23 |
| 3,169,154 | 2/1965 | Martin et al. | |
| 3,279,767 | 10/1966 | Stoltman | 261—50 XR |

HARRY B. THORNTON, *Primary Examiner.*

RONALD R. WEAVER, *Examiner.*